G. J. KINDERMANN.
MEANS FOR CLEANING SHIPS' HULLS.
APPLICATION FILED APR. 13, 1912.
1,063,804.
Patented June 3, 1913.
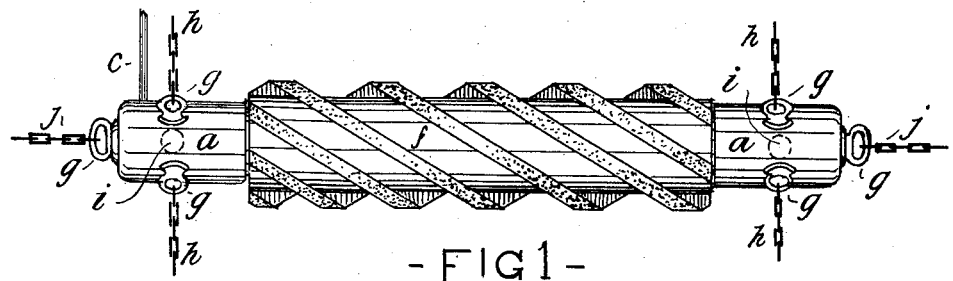
- FIG 1 -
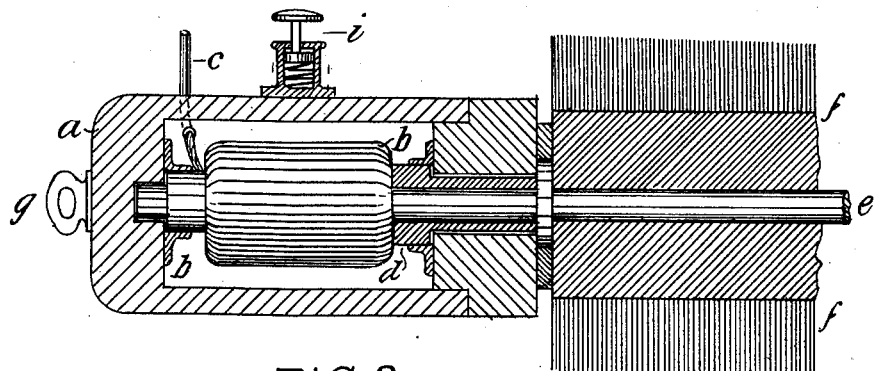
- FIG 2 -
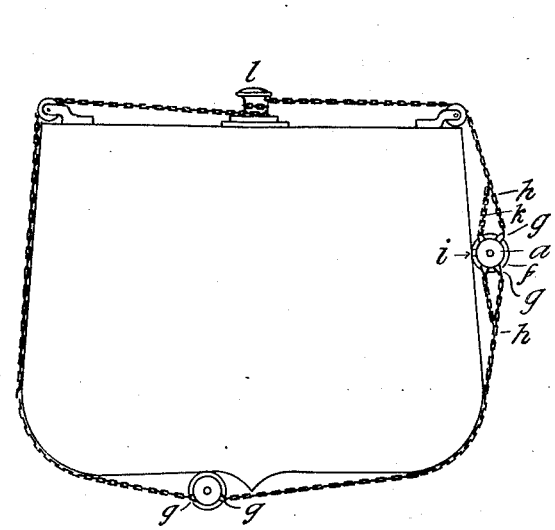
- FIG 4 -
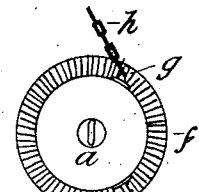
- FIG 3 -
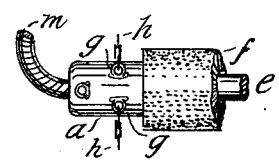
- FIG 5 -
WITNESSES
Sidney Brooks
F. J. Gallagher
INVENTOR
Gustav J. Kindermann
BY Munn & Co
ATTORNEYS

UNITED STATES PATENT OFFICE.

GUSTAV JULIUS KINDERMANN, OF WAYVILLE, SOUTH AUSTRALIA, AUSTRALIA.

MEANS FOR CLEANING SHIPS' HULLS.

1,063,804.  Specification of Letters Patent.  Patented June 3, 1913.

Application filed April 13, 1912. Serial No. 690,504.

*To all whom it may concern:*

Be it known that I, GUSTAV JULIUS KINDERMANN, a subject of the King of Great Britain and Ireland, residing at Park Terrace, Wayville, in the State of South Australia, Commonwealth of Australia, have invented a certain new and useful Improvement in Means for Cleaning Ships' Hulls, of which the following is a specification.

My invention relates to an improved means for cleaning ships' hulls, the object of the invention being to provide means whereby cleaning operations can be carried into effect either while the vessel is in dock or when it is afloat, the whole of the operation being carried out by the aid of eyes or rings and cables worked from the vessel itself and so arranged that by their aid the cleaning appliance can be moved from place to place and held against that part of the vessel upon which it is desired to operate.

In carrying my invention into effect I provide a rotary brush or scraper which is electrically driven by an incased motor upon which the eyes or rings above referred to are mounted so that the appliance is adjustably suspended and operated from the deck of the vessel.

I will now proceed to describe my invention by aid of the accompanying illustrative drawings in which—

Figure 1 is an external view of my cleaning appliance indicating the arrangement of eyes or rings and cables, Fig. 2 is a sectional view of one end on larger scale, showing the arrangement of the motor in outline, Fig. 3 end view of the appliance, Fig. 4 sectional outline of hull of vessel showing method of applying my invention, and Fig. 5 alternative arrangement of driving gear.

In each of the illustrations similar letters of reference are used to denote similar or corresponding parts wherever they occur, and it is to be distinctly understood that the drawings are intended to be illustrative of the principle rather than actual detail working drawings.

In the drawings $a$ is the casing or outer shell of the motor gear, the motor being indicated at $b$, and is of any convenient design or type, the current being supplied thereto by insulated wires $c$. The motor rotates upon insulated bearings $d$ and drives a rotary shaft or spindle $e$ upon which a brush or scraper $f$ is rigidly fastened. The brush or scraper may be of any convenient size or design and may be furnished with fibers or wires for scouring purposes, or with a cutting or milling attachment for use when the marine growth is intensely hard. The rotary shaft may be driven from a single motor or from a motor at each end suitably coupled to the shafting.

In the construction and fitting together of the appliance it is highly important that the motor shall be rendered water-tight with packing and such other means as may be conveniently applied, and care must be taken to prevent any leakage of current through defective insulation.

An important feature of my invention consists in the placing of eyes or rings $g$ upon the motor case to enable the vertical chain or cables $h$ and horizontal chains or cables $j$ to be attached thereto so that the appliance may be brought to bear with adjustable pressure or tension against the ship's hull in any desired location. The eyes or rings for the horizontal chains are preferably placed at what may be termed the back of the machine so that when they are held taut they have a tendency to cause the brush or scraper to be drawn against the hull of the vessel, the end chains or cables enabling its lateral position to be adjusted as may be required.

In Fig. 2 I have shown a spring buffer $i$. One or more such appliances may be used according to the size and weight of the cleaner. This spring buffer may be adjusted in any convenient manner, and prevents the cleaning appliance being pressed too closely to the side of the vessel, thereby protecting the fibers or wire of the rotating brush or scraper.

In Fig. 4 in addition to the eyes or rings shown in Figs. 1 and 3 I have illustrated a duplication of eyes or rings and an auxiliary piece of chain $k$ which may be used as a steadying means in working the appliance.

In Fig. 5 I have shown as an alternative arrangement of the appliance, a flexible driving shaft $m$ being substituted for the electric motor within the casing $a$, such flexible driving shaft being operated from some conveniently arranged external motive power, but the flexible shaft passes through the casing and conveys rotary motion to the spindle *e* to which the brush or scraper *f* is fastened. Under this arrangement the eyes or rings *g* and the chains *h* and *j* will be used as in the preceding figures.

The method of operating my invention will be readily understood on reference to Fig. 4 of the drawings wherein two brushes are illustrated as being applied to the vessel in different parts, it being understood that the brushes may be applied separately if so desired. These brushes are suspended and held in position by the vertical and horizontal chains and may be moved about the vessel by aid of a capstan *l* or by the assistance of the ship's winches or by any other convenient means. It would therefore be obvious that by means of the chains or cables the general cleaning of the hull of the vessel may be carried into effect not only at the sides of the vessel but underneath the same as well as above the waterline, thereby rendering the operation independent of any external machinery, and the appliance can be worked either when the vessel is in dock or afloat.

Having now particularly described and ascertained the nature of my said invention, and in what manner the same is to be performed, I declare that what I claim is:—

1. A device for cleaning ships' hulls, comprising two spaced electric motors each inclosed in a casing, each casing being provided with an eye at the end, a pair of eyes on each side, and a spring buffer between each pair of eyes, a shaft between the motors and coupled thereto, a cleaning member mounted on the shaft to turn therewith, and cables attached to the eyes of each of the motors for securing the device to a ship's hull.

2. A device for cleaning ships' hulls, comprising two spaced casings, each having an eye at the end and a pair of eyes on each side, said eyes being adapted to receive cables by which the device is secured to a ship's hull, a shaft mounted between the casings, a brush on the shaft, and a motor in one casing and operating said shaft.

In testimony whereof I have affixed my signature in presence of two witnesses.

GUSTAV JULIUS KINDERMANN.

Witnesses:
JOHN HERBERT COOKE,
JAMES TINGEY.

Copies of this patent may be obtained for five cents each, by addressing the "Commissioner of Patents, Washington, D. C."